July 25, 1939.  M. E. NULSEN ET AL  2,167,083
ELECTRIC METER
Filed April 30, 1936  2 Sheets-Sheet 1

INVENTORS
Marvin E. Nulsen
BY Lawrence R. Goetz
ATTORNEY

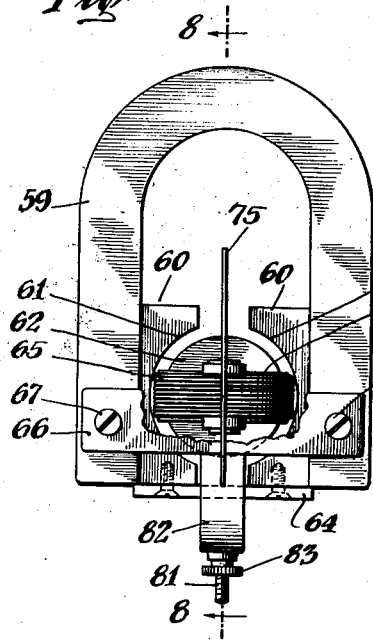
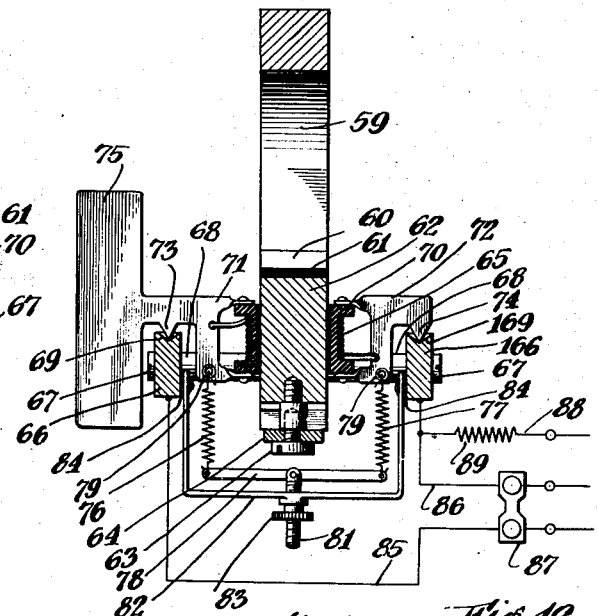
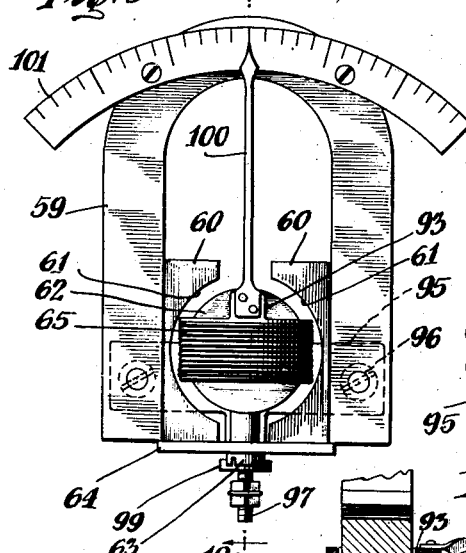
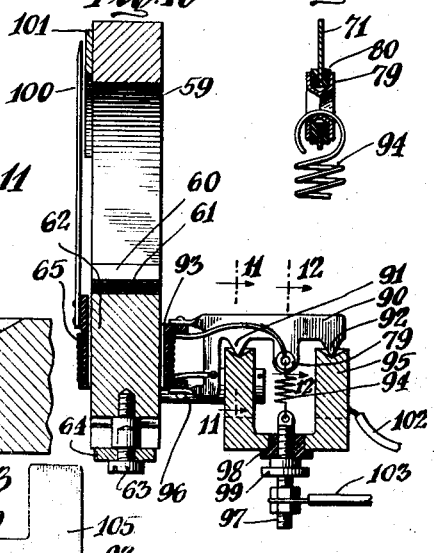

Patented July 25, 1939

2,167,083

UNITED STATES PATENT OFFICE 2,167,083

ELECTRIC METER

Marvin E. Nulsen and Lawrence R. Goetz, Indianapolis, Ind., assignors to P. R. Mallory & Co., Inc., Indianapolis, Ind., a corporation of Delaware Application April 30, 1936, Serial No. 77,106

11 Claims. (Cl. 171—95)

This invention relates to electric meters for the measurement of electric currents and the like.

An object of the invention is to produce an improved meter structure.

Another object is to improve a shadow meter.

A further object is to provide an improved moving coil current indicating meter.

Additional objects are to improve the pivot mountings and damping means for meter armatures.

Other objects of the invention will be apparent from the following description and accompanying drawings taken in connection with the appended claims.

The invention may be embodied in shadow indicating meters such as are used in radio sets and the like to indicate, by a visible shadow on an indicator plate, the degree or exactness of tuning of the set to any particular broadcast signal. The invention may also be embodied in a moving coil type of meter such as an ammeter-voltmeter for measuring electric currents.

The invention accordingly comprises the features of construction, combination of elements, arrangement of parts, and methods of manufacture referred to above or which will be brought out and exemplified in the disclosure hereinafter set forth, including the illustrations in the drawings, the scope of the invention being indicated in the appended claims.

For a fuller understanding of the nature and objects of the invention as well as for specific fulfillment thereof, reference should be had to the following detailed description taken in connection with the accompanying drawings, in which:

Figure 7 is a face view of a moving coil type of shadow indicating ammeter-voltmeter;

Figure 8 is a section on the line 8—8 of Figure 7;

Figure 9 is a face view of a moving coil type dial-indicating ammeter-voltmeter;

Figure 10 is a section on the line 10—10 of Figure 9;

Figure 11 is a detail view illustrating the damping means;

Figure 12 is a detail view illustrating the terminal connections for one end of the moving coil; and Figure 13 is a detail view of a modified form of shadow indicating meter.

Like reference characters denote like parts in the several figures of the drawings.

Figure 1:
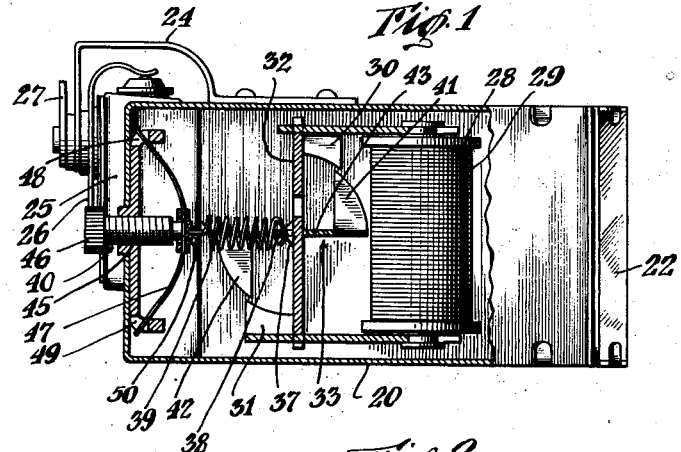
Figure 1 is a top view, partly in section, of a shadow meter involving the present invention.
Figure 2:
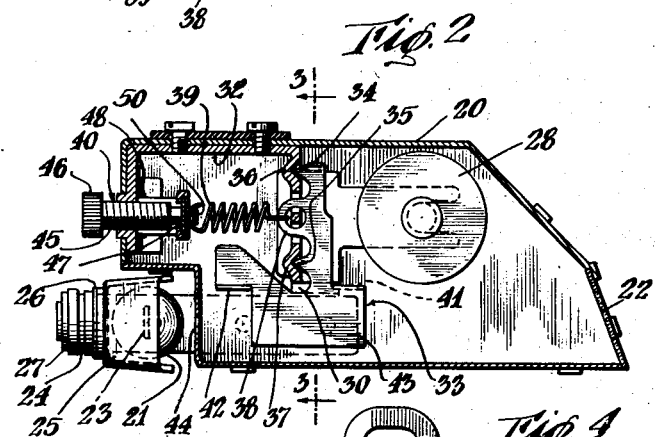
Figure 2 is a vertical section of the shadow meter.
Figure 3:
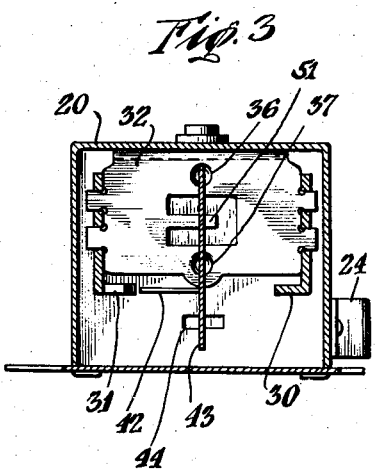
Figure 3 is an end section on the line 3—3 of Figure 2.
Figure 4:
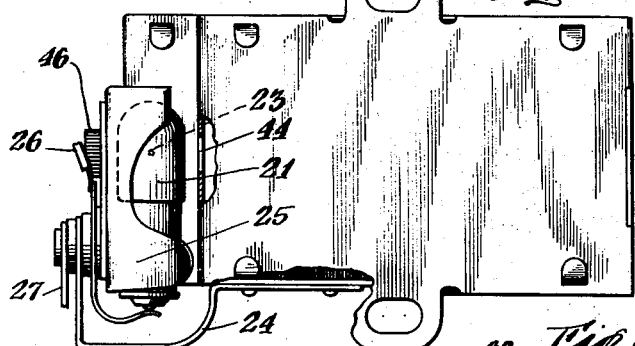
Figure 4 is a bottom view of the shadow meter.

While a preferred embodiment of the invention is described herein, it is contemplated that considerable variation may be made in the method of procedure and the construction of parts without departing from the spirit of the invention. In the following description and in the claims, parts will be identified by specific names for convenience, but they are intended to be as generic in their application to similar parts as the art will permit.

Shadow meters have been used in the past to indicate proper tuning of radio receivers and have consisted in general of a translucent plate spaced from a slotted screen behind which was disposed a light source, a shadow vane pivotally mounted between the slot in the screen and the translucent plate serving to throw a shadow of variable width on the translucent plate. Control of the shadow vane was usually effected by providing an armature attached to the shadow vane and a permanent magnet to hold the armature in a normal or "no-current" position. An electromagnet was associated with the permanent magnet for rotating the armature responsive to current of various strength through the winding of the electromagnet. The poles of the permanent magnet were normally so arranged that when the electromagnet was not energized the plane of the shadow vane was perpendicular to the screen so that the shadow cast thereon was of minimum width and had the appearance of a line. The electromagnet was so connected into the radio receiver that the DC current through the electromagnet would swing the armature so that the shadow vane caused a broader shadow on the translucent screen. Thus when the switch of the radio receiver was closed the current passing through the electromagnet would reach a maximum value so that the shadow vane would be deflected the maximum distance and cause a shadow of maximum width. In tuning the radio receiver to a particular broadcast signal, the circuit was so arranged that the current in the electromagnet would decrease as resonance was approached so that with perfect tuning the shadow would again approach its narrowest width where it would have the appearance of a line. This would indicate to the user of the radio set that it was properly tuned-in to the particular station being received.

In such shadow meters, as well as in most other electrical meters of the prior art, the armature has usually been pivoted for rotation by means of journal-type bearings or by jewel bearings. With ordinary journal-type bearings the friction is quite appreciable and considerable error as well as loss in sensitivity has resulted. While jewel bearings considerably reduce the friction, they are comparatively expensive and difficult of adjustment. The present invention involves a novel type of low-friction meter armature mounting which is simple, cheap and easy of adjustment. This invention also eliminates the necessity of a restoring magnet in a shadow-type tuning indicator.

Referring to the drawings the shadow meter illustrated in Figures 1 to 4 is suitable for use as a tuning meter on radio sets to indicate proper tuning in the manner above described. This meter comprises a metal case 20 housing the operating parts of the meter, an electric lamp 21 serving as the light source and a translucent screen 22 for receiving the shadow indication. The lamp 21 preferably has a single short straight filament 23 positioned substantially in the plane of the shadow vane when the vane is in the normal "no-current" position. For convenience, the metal case 20 is provided with a recessed corner so that lamp 21 may be mounted externally of the case by bracket 24. Lamp 21 is provided with a suitable enclosing case 25 and this case is preferably blackened both inside and outside to prevent undesirable light reflections so that the only light which passes into the shadow meter and on the screen 22 is that coming directly from the filament of lamp 21. Electrical terminals 26 and 27 are provided for connecting the lamp 21 to a source of electric energy.

Within the case 20 is mounted electromagnet 28 having a winding 29 and a pair of poles 30 and 31 having curved faces disposed at opposite positions approximately on the periphery of a circle. A bracket 32 of non-magnetic material, such as brass or the like, supports electromagnet 28 and its pole members 30 and 31 in position and likewise provides pivot supports for the armature-shadow vane assembly 33.

The armature-shadow vane assembly 33 is suitably made from a single piece of magnetically permeable sheet metal such as iron or steel. Sheet metal piece 33 is so shaped and treated as to provide two hardened points 34 and 35 along one edge thereof to serve as pivot points. Points 34 and 35 fit into a pair of spaced circular conical depressions or locating and pivoting recesses 36 and 37 on a face of mounting bracket 32.

In order to hold pivot points 34 and 35 within depressions 36 and 37 a portion of sheet metal part 33 between points 34 and 35 extends out beyond these points and is provided with an eyelet 38. A small coil spring 39 has one of its ends hooked into eyelet 38 and is held at its other end under tension by a tensioning adjusting mechanism 40, comprising parts 45, 46, 47 and 50, supported on bracket 32.

A pair of ears 41 and 42 are also provided as part of sheet metal member 33 and are bent over in opposite directions so that each is approximately at right angles to the main body of sheet member 33. Ears 41 and 42 are provided with curved exterior edges positioned just within the approximate circle defined by the pole faces of electromagnet poles 30 and 31. When the armature is in normal or rest position, just the tips of armature ears 41 and 42 come opposite the faces of poles 30 and 31. Energization of the electromagnet will, however, cause rotation of the armature member 33 so that a greater proportion of the pole faces are covered by the outer edges of armature ears 41 and 42.

The remaining part of sheet metal member 33 forms a flat shadow vane 43 normally positioned in a vertical plane through the center of the case. A small slot 44 is provided in the wall of case 20 between lamp filament 23 and vane 43. The filament 23, slot 44, vane 43 and translucent screen 22 are thereby all disposed in a line passing through the case.

The tension adjusting mechanism for coil spring 39 comprises an adjusting screw 45 positioned in a threaded opening in bracket 32 on the back end of case 20. Screw 45 has its knurled head 46 on the outside of the case for manual adjustment purposes. Within the case a leaf spring 47 extends across the tip of screw 45 and is loosely held at its ends in slots 48 and 49 provided in bracket 32 on opposite sides of screw 45. A clip 50 fits around the central portion of leaf spring 47, but is free to slide thereon. Clip 50 has a small loop punched up from its outer face for receiving the hooked end of coil spring 39. The inner face of clip 50 is provided with a circular recess or hole to accommodate a reduced end on screw 45. It will be apparent that the tension of spring 39 can readily be adjusted by turning the knurled head 46 of screw 45. Thus by turning the screw farther into the case, leaf spring 47 is bent into an arc-like shape. The tension of leaf spring 47 is great enough to hold clip 50 firmly against the tip of screw 45 at all times against the tension of coil spring 39. On turning screw 45 farther out of the case, leaf spring 47 will apply greater and greater tension to coil spring 39, extending its length an amount which is determined by the position of screw 45. It will be obvious that the tension of spring 39 not only serves to hold the pivots 34 and 35 in their sockets but likewise provides the restoring force necessary to return the vane to normal or "zero" position and to react against the force of electromagnet 28. For further safety an extension 51 is provided on frame 32, extending through hole 38 so that the armature member will not be knocked out of position by any accidental jarring of the instrument.

Figure 5:
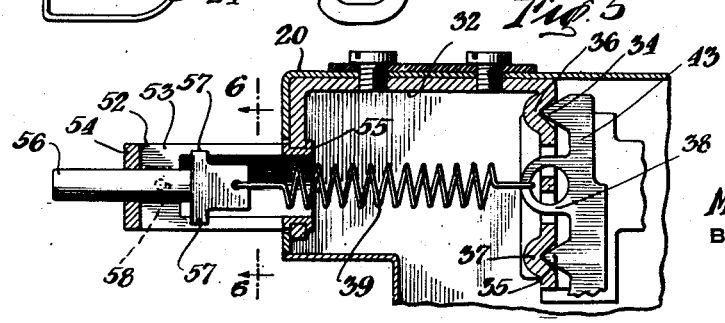
Figure 5 is a detail view showing a modified form of spring adjusting mechanism.
Figure 6:
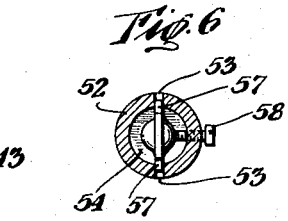
Figure 6 is a section on the line 6—6 of Figure 5.

A modified tension adjusting mechanism is shown in Figures 5 and 6 comprising a tubular member 52 having a pair of axial slots 53 cut through its wall in diametrically opposed positions and an end wall 54 at the external end thereof is provided with a hole of smaller diameter than the inside of the tubular member, said member 52 being secured in a hole in the back of the meter case at 55. A rod-like adjusting member 56 attached to spring 39 and provided with a pair of opposed wing projections 57 is held within tubular member 52 with its shank portion slidable in the hole in wall 54 and its wing portions slidable in slots 53 and a set screw 58 is provided in a threaded hole in the wall of tube 52 for clamping the adjusting member in any position desired.

Referring to the modified form of meter shown in Figures 7 and 8 the stationary parts include a permanent horse-shoe magnet 59 having a pair of poles 60 provided with opposed concave faces 61. A cylindrical bridging core 62 of magnetic material, such as iron, is supported between the faces 61 by a screw 63 mounted on a bracket 64 of non-magnetic material, such as brass, so as to provide a cylindrical slot between faces 61 and the periphery of bridging core 62 wherein armature coil 65 may turn. The armature assembly, of which coil 65 is a part, is pivotally mounted on a pair of cross braces 66 and 166 rigidly secured in spaced relation to the faces of magnet 59 by screws 67 and insulating rods 68 so that cross braces 66 and 166 are insulated from the magnet and from each other. Cross braces 66 and 166 are each provided with a smooth conical depression 69 and 169, respectively, in their upper faces with the bottom of the two depressions on a central axial line through cylindrical bridging core 62, this line representing the position of the axis about which the armature is pivoted.

The armature assembly comprises a fibre spool 70 upon which armature coil 65 is wound and a pair of supports 71, 72 of non-magnetic sheet material, such as bronze, riveted, respectively, to the front and back of the spool. Supports 71 and 72 are provided with downwardly extending points 73 and 74, respectively, on their lower edges, said points resting within conical depressions 69 and 169, respectively, to provide the desired pivot support. A portion of support 71 is formed into a shadow vane 75 for casting a shadow indication on an indicating screen in the same manner as is set forth in the preceding figures. It is, of course, possible to provide a pointer instead of a shadow vane and a dial plate associated therewith to indicate the deflection of the pointer, as is shown in Figures 9 and 10.

The armature assembly is held in centered position and the points 73, 74 are held within depressions 69 and 169 by a spring assembly comprising a pair of coil springs 76 and 77 each secured at its upper end to the pivoted coil supports 71 and 72 below the pivot axis of the armature assembly, and at its lower end to the front and rear ends, respectively, of a lever arm 78. Springs 76 and 77 are insulated from the armature assembly by insulating bushings comprising metal eyelet 79 and insulating ring 80 in members 71 and 72 in a manner similar to that shown more clearly in Figure 12. Lever arm 78 is pivoted on an adjusting screw 81 which is arranged to slide in a hole in U-shaped bracket 82 below the center of the magnet assembly. Bracket 82 is supported by cross braces 66 and 166 but is insulated from these by insulating layers 84. An adjusting nut 83 is threaded on screw 81 to provide for variably tensioning the two springs 76 and 77.

One end of coil 65 is connected to sheet metal support 71 and the other end to support 72. The external circuit connections to coil 65 are made through cross braces 66 and 166 and pivot points 73 and 74 and the supports 71 and 72. Circuit arrangements of conventional form are shown in Figure 8 for using the meter as a combined ammeter-voltmeter. Current in the ammeter circuit will pass in series through incoming conductor 85, brace 66, point 73, support 71, coil 65, support 72, point 74, brace 166 and outgoing conductor 86. Low-resistance shunt 87 will by-pass most of the current, however, as is usual in ammeters. When used as a voltmeter the current will follow the same path through the meter but will pass out through outgoing conductor 88 containing high resistance 89; shunt 87 being removed in this instance.

The meter structure of Figures 7 and 8 can be used for a wide variety of applications in addition to that of tuning indicator and ammeter-voltmeter. The meter can be used in any position, springs 76, 77 serving to hold points 73, 74 in the positioning recesses.

Referring to Figures 9 and 10 a further modified meter is shown. Some of the parts are similar to those of the meter illustrated in Figures 7 and 8 and are numbered accordingly. In this modification, however, the armature coil is supported entirely by one non-magnetic sheet metal support member 90 having two pivot points 91 and 92 along its lower edge and being riveted to the fibre or molded resin spool 93 supporting coil 65.

Pivot points 91 and 92 rest in conical depressions in a U-shaped supporting frame 95 secured to the magnet frame by bolt 96.

A single tensioning spring 94 is hooked into eyelet 79 which is positioned below the pivotal axis through the points 91 and 92 so as to provide stable equilibrium in the armature in its normal position. Spring 94 is secured at its lower end to the end of an adjusting screw 97 held in an insulating bushing 98 in frame 95 and provided with an adjusting nut 99 for varying the position of the screw and thereby regulating the tension on the spring.

An indicating pointer 100 is secured to the front face of spool 93 and is arranged to move over a scale 101 secured to the face of magnet 59.

One end of coil 65 is soldered or welded to sheet metal support 90 and the other end is soldered or welded to metal eyelet 79 which is insulated from support 90 by insulating ring 80 (see Figure 12). The external circuit conductors 102 and 103 are secured, respectively, to metal frame member 95 and tensioning screw 97 so that the current passing to coil 65 will follow a circuit from conductor 102, through frame 95, points 91 and 92 in parallel support 90, coil 65, eyelet 79, spring 94 and screw 97 to conductor 103.

Figure 11 illustrates a means for obtaining damping of the armature movements so that it will be free from excessive oscillations when changes are made in the current flowing in the armature coil or when the meter is vibrated from external disturbances. A damping medium 104 is placed in the conical depression surrounding point 91, this medium preferably comprising a pasty plastic substance of internal friction sufficient to apply the necessary drag to the rotation of the armature but insufficient to prevent the armature to rotate by an amount proportioned to the current flow through the coil 65. The plastic material 104 should preferably be of such viscosity and consistency as to be substantially non-flowing so that it will stay in place in the depression regardless of the position in which the meter is mounted. Materials which are suitable include petroleum jelly, cup grease, transmission grease, and the like. It will be noted that these materials, in addition to providing damping will also lubricate the bearing surfaces and protect them from atmospheric corrosion. In some instances it may be desirable to make material 104 of a conductive substance such as soft greases containing graphite to increase the conductive path between point 91 and the frame 95.

Figure 13 shows a modification of the structure shown in Figures 9 and 10 wherein a shadow vane 105 is provided as part of the armature member 106 in place of the pointer shown in Figures 9 and 10.

It will be obvious that many of the details and expedients shown in the various modifications can be used in the other modifications shown and such interchange of details is intended to be part of this disclosure.

It is also possible to modify the structure so that the pivot depressions are made in the armature frame and the pivot points are held by the stationary supporting frame.

The use of pivot points instead of jewel bearings, journal type bearings and the like provides a more economical mounting and avoids many of the disadvantages of these other types. It has substantially zero frictional hysteresis and the support depressions insure accurate positioning of the armature without undesired lateral or axial motion.

While the present invention, as to its objects and advantages, has been described herein as carried out in specific embodiments thereof, it is not desired to be limited thereby but it is intended to cover the invention broadly within the spirit and scope of the appended claims.

What is claimed is:

1. An electric meter having an armature member and a pivot member for the armature thereof, one of said members having a depression and the other of said members having a portion of hard material tapered to a point, said point resting in said depression, one of said members being rotatable relative to the other of said members, the axis of said rotation making a substantial angle with the axis of said tapered portion of the one of said members.

2. In an electric meter, a first member having a depression and a second member of hard material tapered to a point, said point resting in said depression, said second member being rotatable relative to said first member, the axis of said rotation making an angle of substantially 90° with the axis of the tapered portion of said second member, and a plastic damping medium in said depression surrounding said point, one of said members comprising the armature and the other of said members comprising the pivot for the armature of said meter.

3. In an electric meter, an armature member, a supporting member therefor, one of said members being provided with a pair of projections each tapered to a point, both of said points having substantially the same orientation relative to said member upon which they are provided, the other of said members having a pair of tapered depressions, both of said depressions being on the same side thereof and being spaced apart a distance equal to the spacing of said points, said points resting in said depressions whereby said armature is adapted to turn about an axis coinciding with a line through said points, the axes of said projections making a substantial angle with said axis of rotation of said armature.

4. An electric meter comprising an armature member, a supporting member therefor, said armature member being provided with a pair of pointed projections both extending in the same direction with their axes parallel, said supporting member having a pair of tapered depressions in one face thereof, both of said depressions facing in the same direction and being spaced apart a distance equal to the spacing of said points, said points resting in said depressions, an indicator attached to said armature, and a spring member arranged so as to hold said points in said depressions and to supply a restoring force to said indicator.

5. In an electric meter, an armature member, a supporting member therefor, said armature member being provided with a pair of pointed projections both extending in the same direction with their axes parallel, said supporting member having a pair of tapered depressions in one face thereof both said depressions facing in the same direction and being spaced apart a distance equal to the spacing of said projections, said projections resting in said depressions, an armature coil mounted on said armature, a pair of lead-in conductors for said meter connected to the two parts of said supporting member having said two depressions, respectively, means insulating said parts from each other, means insulating said points from each other, the ends of said coil being connected, respectively, to said projections, whereby said lead-in conductors are connected to the ends of said coil through the pivots formed by said projections and depressions.

6. An electric meter comprising an armature member, an electric coil mounted thereon, a support member for said armature member, a depression in one of said members and a point on the other of said members resting in said depression, said armature member and associated coil being rotatable about an axis through said point, a tensioning spring connected at one of its ends to said support and at the other of its ends to said armature and being arranged so as to hold said point in said depression and to hold said armature normally in "zero" position.

7. An electric meter comprising an armature member, an electric coil mounted thereon, a support member for said armature member, a depression in one of said members and a point on the other of said members resting in said depression, said armature member and associated coil being rotatable about an axis through said point, a tensioning spring connected at one of its ends to said support and at the other of its ends to said armature and being arranged so as to hold said point in said depression and to hold said armature normally in "zero" position, a pair of lead-in conductors for said meter, one of said conductors being connected to one end of said coil through said tensioning spring.

8. An electric meter comprising an armature member, an electric coil mounted thereon, a support member for said armature member, a depression in one of said members and a point on the other of said members resting in said depression, said armature member and associated coil being rotatable about an axis through said point, a tensioning spring connected at one of its ends to said support and at the other of its ends to said armature and being arranged so as to hold said point in said depression and to hold said armature normally in "zero" position, a pair of lead-in conductors for said member, one of said conductors being connected to one end of said coil through said tensioning spring, the other of said conductors being connected to the other end of said coil through said support member and said point.

9. In an electric meter, an armature member, a supporting member therefor, said armature member being provided with a pair of pointed projections both extending in the same direction with their axes parallel, said supporting member having a pair of tapered depressions in one face thereof both said depressions facing in the same direction and being spaced apart a distance equal to the spacing of said points, said points resting in said depressions, an indicator attached to said armature, and a spring member arranged so as to hold said points in said depressions and to supply a zero bias to said indicator, and means to adjust the tension on said spring to vary the restoring force of said meter.

10. An electric meter comprising an armature member, a support member therefor, said armature member being pivoted on said support member, a helical spring attached at one end to said armature member and at the other end to said support member and having its axial line at a substantial angle with the axis about which said armature member is pivoted, and means for applying a variable tensioning force to said spring.

11. An electric meter comprising an armature member, a support member therefor, said armature member being pivoted on said support, a helical spring attached at one end to said armature member and at the other end to said support member and having its axial line at a substantial angle with the axis about which said armature member is pivoted, and means for applying a tensioning force to said spring and for varying said tensioning force to vary the restoring force of said meter.

MARVIN E. NULSEN.
LAWRENCE R. GOETZ.